US012626015B2

(12) United States Patent
Lavan et al.

(10) Patent No.: US 12,626,015 B2
(45) Date of Patent: May 12, 2026

(54) METHOD FOR SECURELY EXTRACTING DATA FROM INVOICES USING AI CLOUD SERVICE

(71) Applicants: Ofer Lavan, Salit (IL); Rotem Ben-Lulu, Netanya (IL)

(72) Inventors: Ofer Lavan, Salit (IL); Rotem Ben-Lulu, Netanya (IL)

( * ) Notice: Subject to any disclaimer, the term of this patent is extended or adjusted under 35 U.S.C. 154(b) by 98 days.

(21) Appl. No.: 18/922,484

(22) Filed: Oct. 22, 2024

(65) Prior Publication Data

US 2026/0111592 A1    Apr. 23, 2026

(51) Int. Cl.
*G06F 21/62*     (2013.01)
*G06T 11/00*     (2006.01)
*G06V 30/10*     (2022.01)

(52) U.S. Cl.
CPC .......... *G06F 21/6245* (2013.01); *G06T 11/00* (2013.01); *G06V 30/10* (2022.01)

(58) Field of Classification Search
CPC ...... G06F 21/6245; G06T 11/00; G06V 30/10
See application file for complete search history.

(56) References Cited

U.S. PATENT DOCUMENTS

| | | | | |
|---|---|---|---|---|
| 12,300,008 B1 * | 5/2025 | Rangarajan | ............ | G06V 30/40 |
| 12,561,508 B1 * | 2/2026 | Yerramsetty | ......... | G06F 40/103 |

* cited by examiner

*Primary Examiner* — Sangseok Park

(57)          ABSTRACT

A computer-implemented method for extracting information from invoices using third-party cloud AI service that includes the steps of performing OCR on an invoice image to generate an OCR Results file containing original words from the invoice and corresponding positional data, generating a JSON file by including original words that appear in a pre-prepared table of permitted words for disclosure with their corresponding positional data, and by indicating only corresponding positional data of original words that unpermitted for disclosure, generating an image based on the generated JSON file, by including the permitted words and alternative words to the unpermitted words, along with their corresponding positional data, uploading the generated image to the AI cloud service for data extraction processing, receiving from the AI cloud service word classifications and corresponding positional data, and using the received word classifications and their corresponding positional data to classify unpermitted original words of the invoice.

3 Claims, 2 Drawing Sheets

10

| | |
|---|---|
| 11 Local processing unit | 14 Communication interface |
| 12 Censoring module | 15 Reintegration module |
| 13 Image generation module | 16 Data analysis unit |

METHOD FOR SECURELY EXTRACTING DATA FROM INVOICES USING AI CLOUD SERVICE

DESCRIPTION

Technical Field

The present invention relates to the field of data extraction and processing, specifically to a method for extracting information from invoice documents using artificial intelligence (AI) while protecting sensitive company information from potential exposure during the process of uploading invoice data to third-party AI cloud systems or third-party document processing platforms.

Background Art

In many industries, companies rely on AI to extract relevant information from invoices for automation and data processing purposes. Typically, this process involves uploading an image of an invoice to a third-party AI cloud service or document processing platform, which extracts data from the image of the original document.

However, uploading sensitive company information to external AI or platform services poses a significant privacy risk. Sensitive data, such as supplier names, invoice numbers, and payment amounts, may be exposed during transmission and processing by third-party providers. This creates a need for a method that allows companies to utilize AI-driven or platform-based data extraction while ensuring that critical information remains protected.

SUMMARY OF THE INVENTION

The present invention provides a computer-implemented method for securely extracting information from invoices using AI cloud service, while preventing company information leakage. The invention involves processing the invoice locally to censor sensitive information before uploading it to a third-party AI cloud service. The AI processes the censored data, and the original sensitive information is reintegrated after processing, ensuring both secure handling of the data and reliable extraction of information. The invention applies primarily to invoices but may also extend to other types of documents. The term "invoice" in this disclosure and the claims refers to documents in general, and the term "AI" refers to AI platforms as well as other types of document processing platforms. The term "words" in this disclosure and the claims refers to words and numbers.

DESCRIPTION OF THE DRAWINGS

The attached drawings are not intended to limit the scope or application of the invention but merely to illustrate one possible implementation.

DETAILED DESCRIPTION OF THE INVENTION

Figure 1:
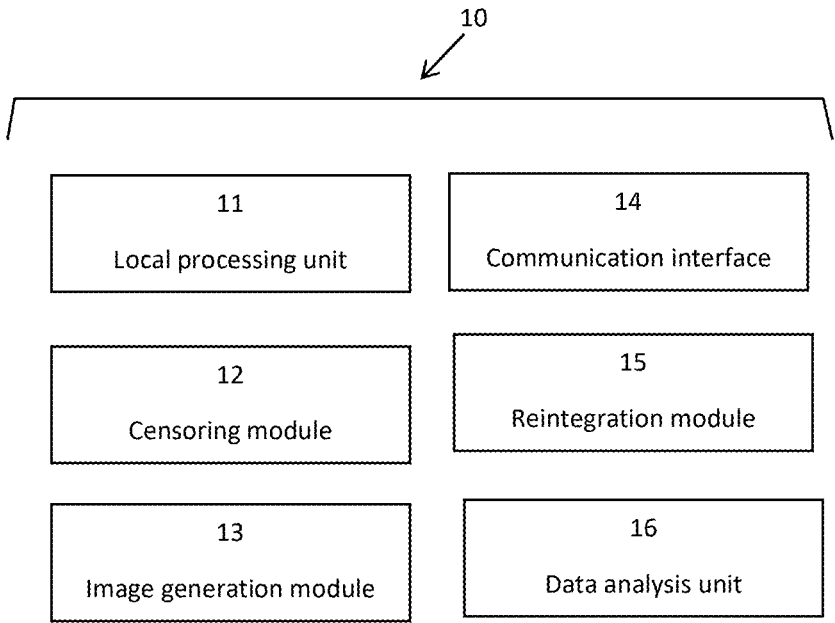
FIG. 1 is a schematic depiction of the system (10).

The invention comprises the following steps:

OCR Processing of the Original Invoice: A local OCR process is applied to an image of the original invoice. This process generates an OCR results file (that can be any format that may include text and positions data such as JSON, XML, and equivalent file formats), which contains words and numbers from the invoice along with the positional data (coordinates) of each word and number. These files create a map of the textual content of the invoice and its corresponding locations on the document.

Censoring Sensitive Data: The system identifies in the OCR Results file unpermitted words that need to be protected from exposure, based on identifying permitted words in a predefined table of permitted words; means that all the words that do not appear in the table of the permitted words are unpermitted and need to be replaced with substitute or alternative words. These unpermitted words may be replaced with substitute words from a predefined table or dictionaries. The substitute words are preferably chosen to match the length and context of the original unpermitted words to prevent disruption of the document layout and to ensure effective AI processing. For example, a valid substitute for a street name may also be a different but meaningful street name. This step results in a JSON file where unpermitted words are missing but their existence and their positional data are indicated. The term "JSON file" in this disclosure and in the claims refers to any interchange file format such as JSON or XML.

Generation of the Image: An image is created based on the JSON file. This image mirrors the layout and appearance of the original invoice, but with unpermitted words replaced by substitute words. The image is now ready for upload to a third-party AI cloud service without exposing the unpermitted original words that contain sensitive information.

Uploading the Image to the AI Cloud service: The image is uploaded to the third-party AI cloud service for data extraction. The AI cloud service performs its standard data extraction process and returns a structured output, such as a JSON file, containing word classifications, positional data, and contextual labels. This file is referred to as the extracted modified JSON file.

Reintegration of Original Sensitive Data: Using the extracted JSON file, the system matches the positional data and word classifications with the original unpermitted words. The system replaces the substitute words in the extracted JSON file with the corresponding original unpermitted words, thereby generating a genuine JSON file. This final file contains the true classified data of the invoice and can be used for further analysis and processing.

Analysis of the Genuine JSON File: The genuine JSON file is configured to be used to analyze and process the invoice data. Because the original unpermitted information has been securely reintegrated, the company benefits from accurate data extraction while ensuring that no sensitive information was exposed during the upload process. The company can make the first two steps in the company's computers and sends to the entity who makes for it this service the generated JSON files that contain the permitted words, and characteristics only of the unpermitted words but without the unpermitted words themselves, thereby preventing any leak of sensitive information to the company.

Advantages of the Invention

Data Security: Sensitive company information is protected during the data extraction process, as the unpermitted words are not uploaded to the third-party AI cloud service.

Data Accuracy: The method ensures that accurate invoice information is reintegrated after AI processing, maintaining the integrity of the extracted data.

Seamless Integration: The use of substitute words that are contextually relevant ensures that AI processing is not disrupted, allowing for efficient extraction of relevant data.

Customization: The system allows companies to define their own list of permitted words, providing flexibility to adapt to different types of invoices and data categories.

EXAMPLE

Consider a company that receives an invoice containing the following information:

Supplier Name: "ABC Industries";

Invoice Number: "INV12345";

Total Price: "$10,000."

The system performs OCR on the invoice and generates an OCR Results file mapping each word to its coordinates on the document. The words "ABC Industries" and "INV12345" do not appear in the table of the permitted words and therefore considered as unpermitted information.

Next, the system replaces these unpermitted words with substitute alternative words, preferably from a predefined table or dictionary. "ABC Industries" is replaced with "XYZ Solutions," and "INV12345" is replaced with "INV67890." A modified image is created with these replacements, which is then uploaded to the AI cloud service for processing.

After receiving the extracted data from the AI cloud service, the system reintegrates "ABC Industries" and "INV12345" by matching the positional data and classifications. The final extracted genuine JSON file can be used for further analysis without compromising the company's sensitive information.

Preventing Information Leakage and Trust in Data Processing

The fundamental goal of this invention is to prevent information leakage outside of the company when performing data extraction and analysis on its invoices or other documents. All operations—such as OCR processing, data censoring, and reintegration—are designed to be carried out on the company's own computers, servers, or trusted third-party systems. Only the analysis operation, conducted using an external AI cloud service, takes place in an environment that is not fully guaranteed by the company. However, since unpermitted words or numbers are replaced before uploading the relevant file to the AI cloud service, the sensitive data never leaves the trusted systems and computers, thereby eliminating the risk of exposure.

Customizable Censorship Tables for Sensitive Data Protection

Each company using the method described herein is advised to produce or customize a table of authorized words that are permissible for upload to the external AI cloud for analysis. All other words (or numbers) that are not explicitly authorized are censored and replaced with substitute words. These substitute words can be sourced from predefined tables or dictionaries, ensuring they match the original words both in length and in contextual meaning. For example, typical authorized words might include "invoice," "date," "number," and other generic terms. This customizable approach provides flexibility for companies to adapt the method to their unique data sensitivity needs, while maintaining the integrity of the document structure during cloud-based analysis.

In summary, we can say that the present invention discloses a computer-implemented method for extracting information from invoices using third-party cloud AI service. The method comprising the following steps:

(a) performing, by a computer system(10), Optical Character Recognition (OCR) on the invoice image to generate the OCR Results file containing original words from the invoice and their corresponding positional data.

(b) generating, by the computer system, the JSON file based on the OCR Results, by including the original words that appear in the pre-prepared table of permitted words for disclosure, along with their corresponding positional data, and by indicating corresponding positional data of original words that do not appear in the table and that will not be included in the generated JSON file. In this step instead of the unpermitted words the generated JSON will include information regarding these unpermitted words (e.g. Length, Type (Text/Number) etc.) but not the unpermitted words themselves.

(c) generating, by the computer system, an image based on the generated JSON file, by including the permitted original words and alternative words to the unpermitted original words, along with their corresponding positional data. It is preferably that the alternative words maintain length and context to the unpermitted original words, thereby preserving the document structure and ensuring uninterrupted AI processing.

In case of using AI cloud service that uses images for data extraction processing then the method includes this step. But, when using AI cloud service to which possible to upload JSON files, then this step will be performed on the generated JSON file and there is no need to generate the image.

(d) uploading, by the computer system, the generated image or the generated JSON, as applicable, to the third-party AI cloud service for processing the data extraction.

(e) receiving, by the computer system, from the AI cloud service word classifications and their corresponding positional data.

(f) using the received word classifications and their corresponding positional data to classify unpermitted original words of the invoice, while protecting the unpermitted words from exposure to third-party AI service systems.

The present invention also refers to the computer system (10) for securely extracting the information from the invoices using the AI cloud service. The computer system may include the following parts:

(a) a local processing unit configured to perform the Optical Character Recognition (OCR) on the invoice image for generating the OCR results file containing the original words from the invoice and their corresponding positional data.

(b) a JSON generator module, operably connected to the local processing unit, configured to include the permitted original words and to indicate corresponding positional data of the unpermitted original words, with their corresponding positional data, while not including the unpermitted original words in the generated JSON file.

(c) an image generation module, when applicable, configured to create an image based on the generated JSON file. The image retains the layout and appearance of the original invoice with unpermitted words replaced by alternative words, along their corresponding positional data.

(d) a communication interface, configured to upload the image to a third-party AI cloud service for data extraction processing and for receiving word classifications and corresponding positional data.

The received word classifications and their corresponding positional data are intended to be used for classifying unpermitted original words of the invoice, while protecting the unpermitted words from exposure to third-party AI service systems.

Figure 2:
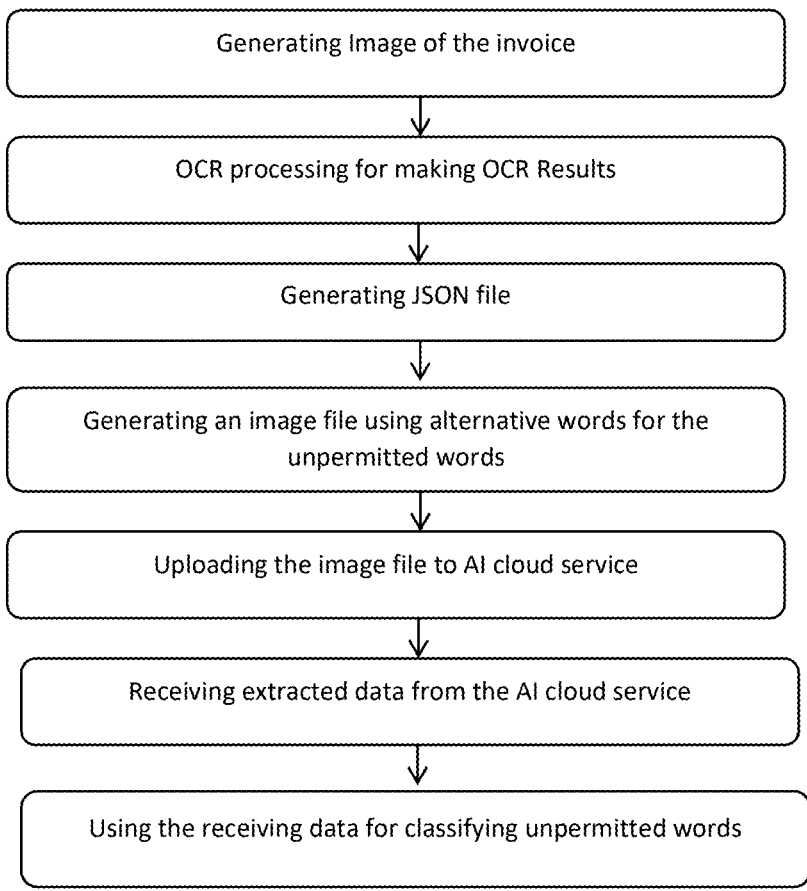
FIG. 2 is a flowchart illustrating the process (method).

FIG. 1 illustrates the system (10) that includes a Local processing unit (11) for OCR processing of the invoice image, a Censoring module (12) for replacing sensitive words with other words to create the image file; Image generation module (13) for generating the image based on the JSON file; a Communication interface (14) to upload the image to the AI cloud service and receives the extracted data; Reintegration module (15), and Data analysis unit (16):

FIG. 2 is a general flowchart of the process: OCR processing; Generating a censored JSON file; Generating the image file with alternative words; Uploading the image to AI cloud service; Receiving the extracted data; Using the received data to classify unpermitted original words.

What we claim is:

1. A computer-implemented method for extracting information from invoices using third-party cloud AI service, the method comprising:

(a) performing, by a computer system, Optical Character Recognition (OCR) on an invoice image to generate an OCR Results file containing original words from the invoice and their corresponding positional data;

(b) generating, by the computer system, a JSON file based on the OCR Results file, by including original words that appear in a pre-prepared table of permitted words for disclosure, along with their corresponding positional data, and by indicating corresponding positional data of original words that do not appear in the pre-prepared table, while not including the unpermitted original words in the generated JSON file;

(c) generating, by the computer system, an image based on the generated JSON file, by including the permitted original words and alternative words to the unpermitted original words, along with their corresponding positional data;

(d) uploading, by the computer system, the generated image to a third-party cloud AI service for data extraction processing;

(e) receiving, by the computer system, from the cloud AI service word classifications and their corresponding positional data;

(f) using the received word classifications and their corresponding positional data to classify unpermitted original words of the invoice, while protecting the unpermitted words from exposure to third-party AI service systems;

wherein the alternative words maintain length and context to said unpermitted original words, thereby preserving a document structure and ensuring uninterrupted AI processing.

2. A computer-implemented method for extracting information from invoices using third-party cloud AI service, the method comprising:

(a) performing, by a computer system, Optical Character Recognition (OCR) on an invoice image to generate an OCR Results file containing original words from the invoice and their corresponding positional data;

(b) generating, by the computer system, a JSON file based on the OCR Results file, by including original words that appear in a pre-prepared table of permitted words for disclosure, along with their corresponding positional data, and by including alternative words to original words that do not appear in the pre-prepared table and that are not included in the generated JSON file, along their corresponding positional data;

(c) uploading, by the computer system, the generated JSON file to a third-party cloud AI service for data extraction processing;

(d) receiving, by the computer system, from the cloud AI service word classifications and their corresponding positional data;

(e) using the received word classifications and their corresponding positional data to classify unpermitted original words of the invoice, while protecting the unpermitted words from exposure to third-party AI service systems;

wherein the alternative words maintain length and context to said unpermitted original words, thereby preserving a document structure and ensuring uninterrupted AI processing.

3. A computer system for securely extracting information from invoices using cloud AI service, comprising:

(a) a local processing unit configured to perform Optical Character Recognition (OCR) on an invoice image to generate an OCR results file containing original words from the invoice and corresponding positional data;

(b) a JSON generator module, operably connected to the local processing unit, configured to include original words that appear in a pre-prepared table of permitted words for disclosure, along with their corresponding positional data, and to indicate corresponding positional data of original words that do not appear in the pre-prepared table, while not including the unpermitted original words in the generated JSON file;

(c) an image generation module, configured to create an image based on the generated JSON file, wherein the image retains the layout and appearance of the original invoice with unpermitted words replaced by alternative words, along their corresponding positional data;

(d) a communication interface, configured to upload the image to a third-party cloud AI service for data extraction processing and for receiving word classifications and corresponding positional data;

wherein the received word classifications and their corresponding positional data are intended to be used for classifying unpermitted original words of the invoice, while protecting the unpermitted words from exposure to third-party AI service systems;

wherein the image generation module replaces unpermitted words with substitute words of identical character length to preserve the document structure during AI cloud processing.

* * * * *